Figure 1:
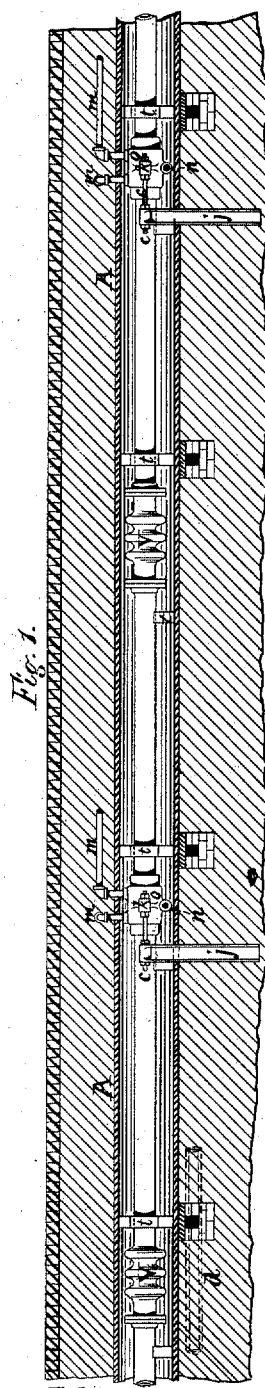

(No Model.) 4 Sheets—Sheet 1.

C. E. EMERY.
APPARATUS FOR SUPPLYING CITIES WITH STEAM, &c.

No. 253,917. Patented Feb. 21, 1882.

Witnesses:—
J. B. White
A. E. Rockwell

Inventor:—
Chas. E. Emery (No Model.)  
4 Sheets—Sheet 2.
C. E. EMERY.
APPARATUS FOR SUPPLYING CITIES WITH STEAM, &c.
No. 253,917. Patented Feb. 21, 1882.
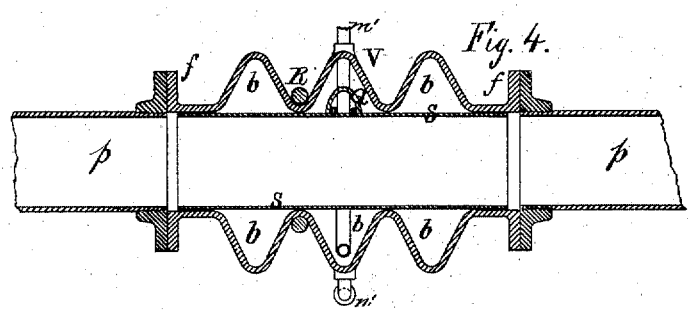
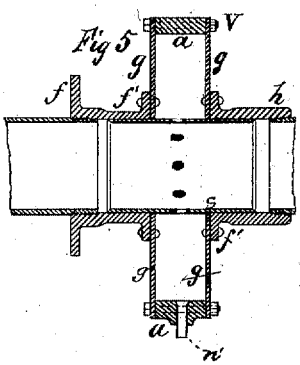
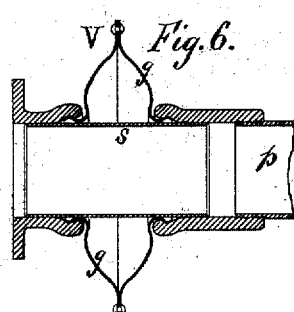
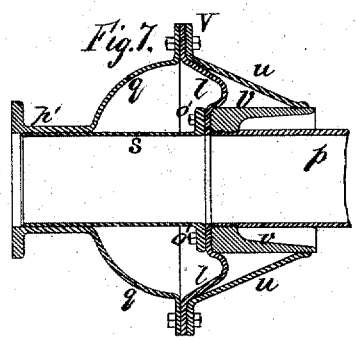
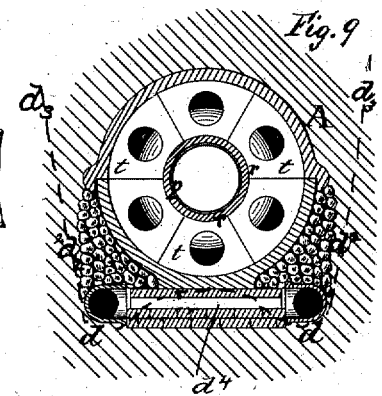
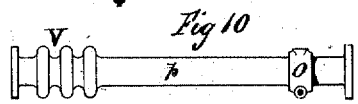
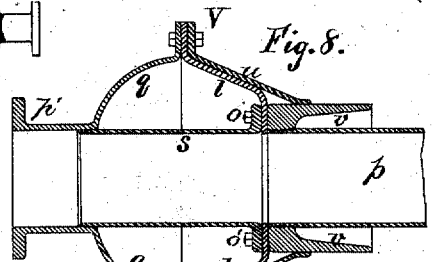
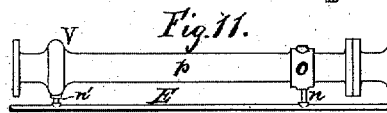
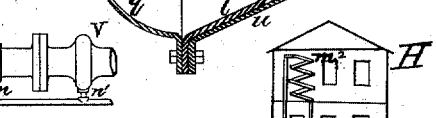
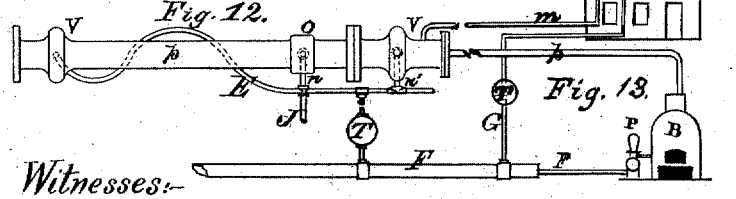
Witnesses:—
J. B. White
R. E. Rockwell
Inventor:—
Chas. E. Emery (No Model.)

C. E. EMERY.
APPARATUS FOR SUPPLYING CITIES WITH STEAM, &c.

No. 253,917. Patented Feb. 21, 1882.

4 Sheets—Sheet 3.

Witnesses:

Inventor:

(No Model.)

4 Sheets—Sheet 4.

C. E. EMERY.
APPARATUS FOR SUPPLYING CITIES WITH STEAM, &c.

No. 253,917.

Patented Feb. 21, 1882.

Witnesses:—

Inventor:—

UNITED STATES PATENT OFFICE.

CHARLES E. EMERY, OF BROOKLYN, NEW YORK.

APPARATUS FOR SUPPLYING CITIES WITH STEAM, &c.

SPECIFICATION forming part of Letters Patent No. 253,917, dated February 21, 1882.

Application filed March 8, 1880. (No model.)

*To all whom it may concern:*

Be it known that I, CHARLES E. EMERY, of the city of Brooklyn, in the county of Kings and State of New York, (office New York city,) have made certain new and useful Improvements in Apparatus for Supplying Cities with Steam or other Fluids; and I do hereby declare that the following is a full, clear, and exact description of the same, reference being had to the accompanying drawings, making part of this specification.

In supplying heat to cities by means of steam or other fluid conveyed in pipes it is usually necessary or convenient to lay the main pipes, properly protected from radiation, in covered trenches or subterranean galleries in the public streets. Such pipes are necessarily run for long distances in substantially straight lines parallel with the curbs and the water and gas supply mains.

The object of this invention is to supply new and improved features and working parts which, in combination with other improved features and devices, (partly set forth in this application and partly in other applications pending or about to be made,) will constitute a new and improved system for supplying steam or other fluid to villages, towns, and cities from works centrally located, through pipes properly protected from radiation of heat and from injury, through which pipes steam or other fluids may be supplied to the inhabitants of villages, towns, and cities, for use for warming, culinary, laundry, chemical, manufacturing, and for all other domestic and mercantile purposes, and for power, a particular feature of the present invention having for its object to dispense with the use of slip-joints and large stuffing-boxes on pipes which are to be laid for considerable distances in a straight line, as in the supply of steam or hot water to cities, and to perfect a system of supply in which the variations of length, due to changes of temperature, are compensated for by constructing portions of the pipe of such shape as to utilize the flexibility and elasticity of metals or other substances.

It is well known in practical circles that stuffing-boxes or slip-joints are liable to leak, producing waste, not only by the amount of fluid actually lost, but also by admitting and transmitting vapor or fluid among the non-conducting material used to surround steam-conducting pipes, thereby destroying such material, inducing corrosion of the pipes, and causing increased losses by radiation and conduction, as vapor acts readily to transfer heat. Such joints also require constant care and attention to renew and tighten the packing and keep the moving surfaces clean, for if the latter be neglected they soon become corroded, by which freedom of movement is prevented and leaks are produced at other joints, thereby greatly extending the difficulties. In my improved system the pipes, when located in the streets as above stated, or in any usual manner, are provided at intervals with bellows-shaped devices, which I term "variators," in which preferably thin metal is swelled into the form of bulbs, or used as disks in the ends of short chambers or enlargements of the pipes, so that the pipe at such points, though fluid-tight, is still free to change its length within the limits necessary to provide for variations of temperature. By this method of construction I obtain perfect working, unbroken, continuous lines of metallic steam street-main pipes that can be operated for the purposes herein stated, and so remain as long as the material of which they are made will last, without periodically renewing and replacing stuffing-boxes or slip-joints through openings in the surface of the street at distances of about one hundred feet, as is required, for instance, in the system shown in patent to B. Holly, No. 193,086.

The invention relates to a system for supplying steam or other fluids through street or other mains, based on the elastic feature of compensation above referred to, and embodies various combinations and details, hereinafter set forth, which are considered necessary to make such system practically successful.

Figure 2:
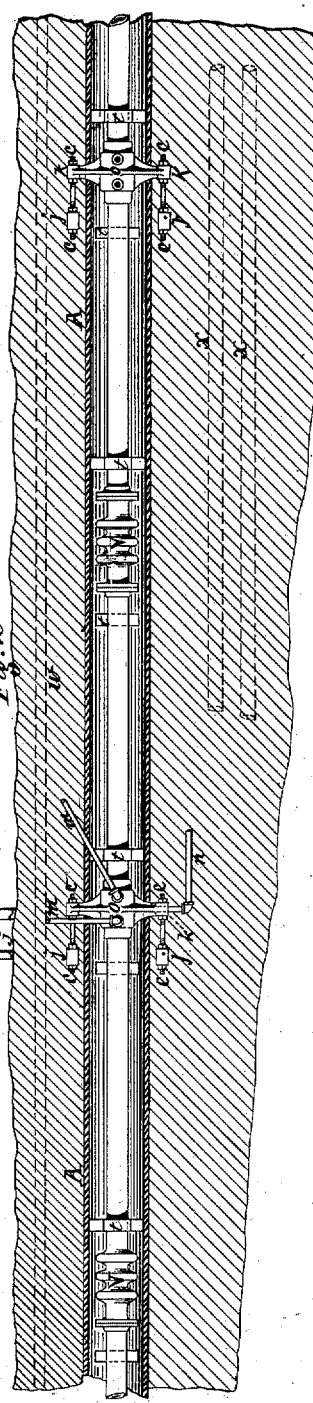
Figure 3:
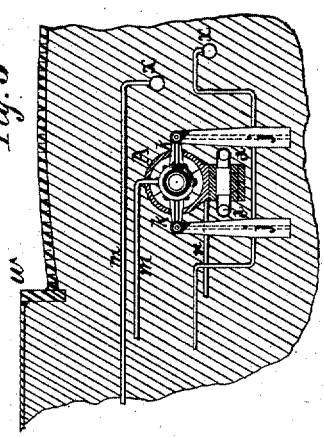
Figure 14:
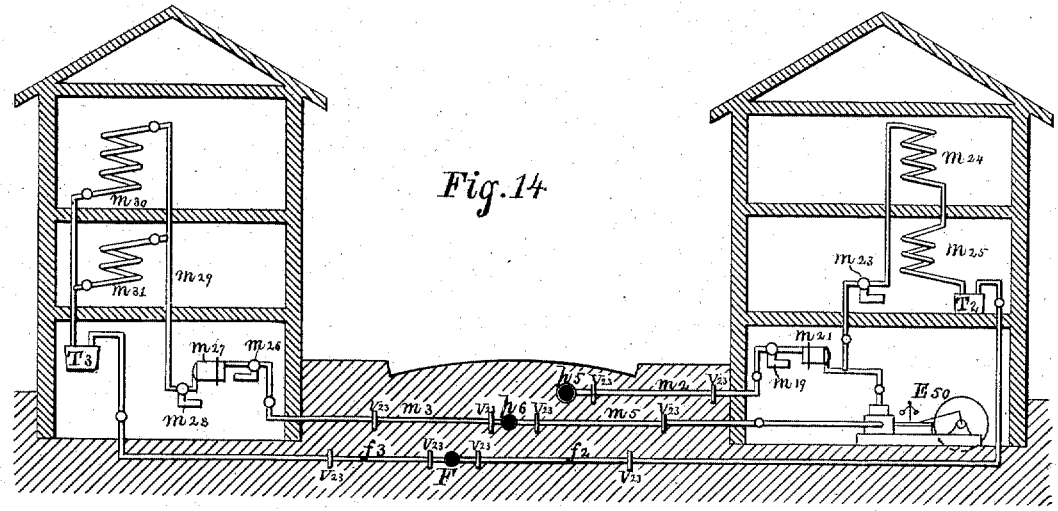
Figure 15:
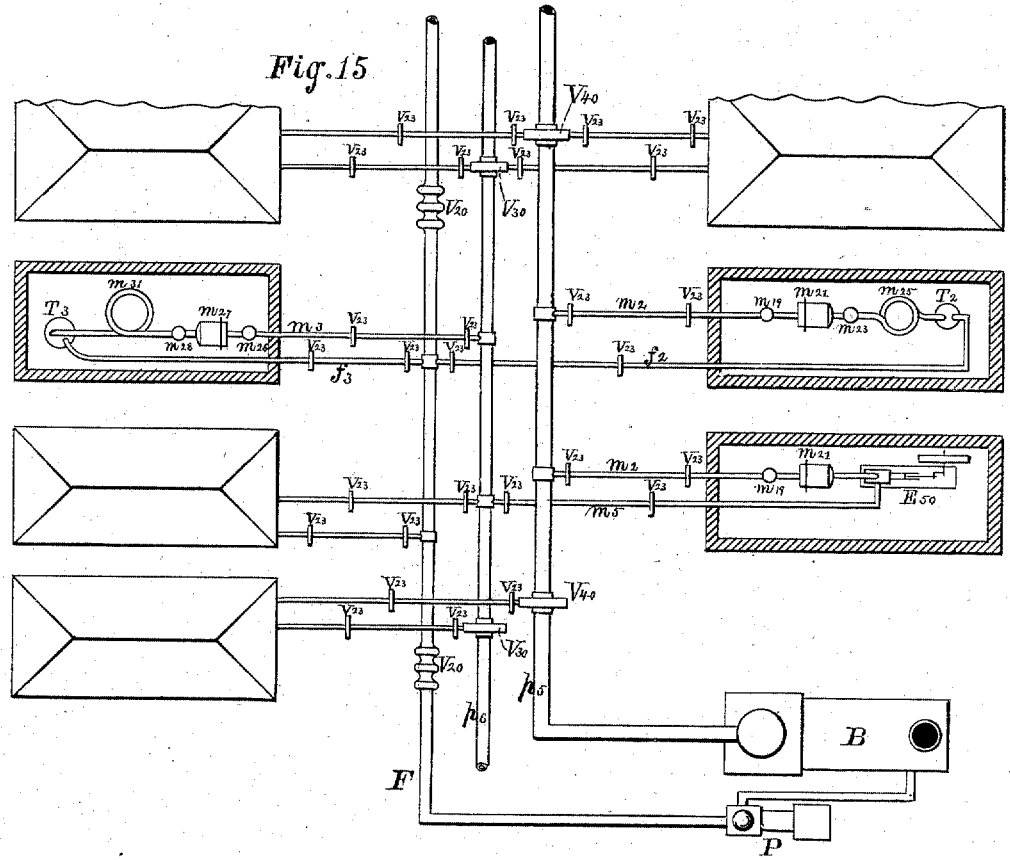
Figure 17:
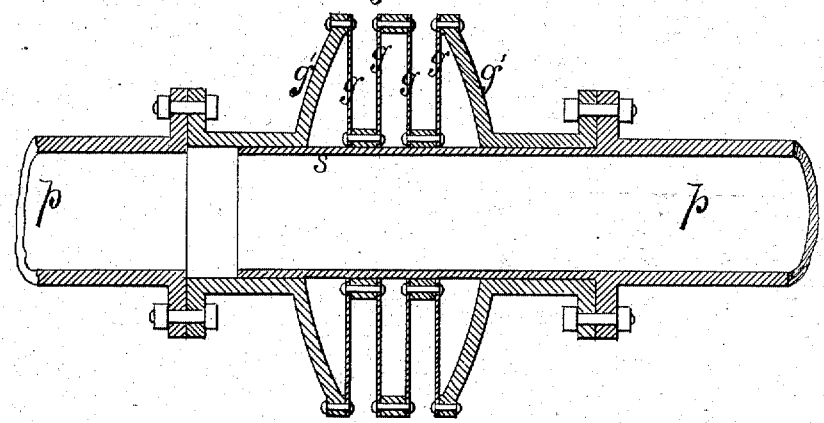
Figure 16:
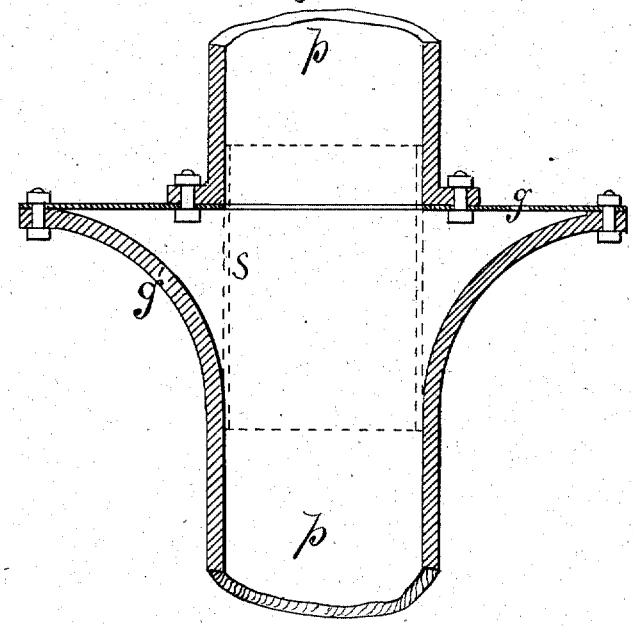

In the accompanying drawings, Figure 1 represents a vertical section of an underground gallery, showing steam-pipe in position connected on my improved system. Fig. 2 is a horizontal section of the same gallery, showing also the pipe, &c. Fig. 3 is a cross-section of a portion of a street and of the steam-pipe shown in previous figures. Fig. 4 is a longitudinal section of one of my improved variators, the enlargements being in the form of bulbs or double bells. Fig. 5 is a longitudinal section of one of the forms of my improved variator, being constructed with flat elastic plates on the sides of the enlarged chamber. Fig. 6 is a similar view of a modification of the variator shown in Fig. 5, in which elastic corrugated plates are used on the sides of the chamber forming the enlargement of pipe. Figs. 7 and 8 are central longitudinal sections, showing in two positions a variator adapted to use a flexible diaphragm to maintain lightness and permit expansion of the pipe. Fig. 9 is a cross-section through the steam-pipe between the variators, to show the chocks to support the pipe and maintain its stability when under the compression that occurs with some forms of the variators. Fig. 10 represents a combined pipe, variator, and outlet-chamber adapted for duplication in cast metal. Fig. 11 is an elevation, and Fig. 12 a plan, of a portion of a street-main, showing a method of draining the pipe, variators, and outlet-chambers. Fig. 13 is an elevation of a boiler and building and connecting-pipes, designed for reference in connection with Figs. 11 and 12, independent of scale or exact relative position, the pipes for convenience of illustration being shown in continuation of the corresponding pipes on the plan view, Fig. 12. Fig. 14 is a cross-section of a street and of buildings upon the same, showing an arrangement of details for carrying out a steam-heating system. Fig. 15 is partly a plan and partly a horizontal section, referring to Fig. 14, and showing the same and other details. Figs. 16 and 17 represent sectional views of modifications in the form of the variators.

The variators are designated V. They are inserted as part of the pipe at distances suited to the extent of expansion and contraction, and between the same are outlets provided for the escape of the steam or fluid. Preferably the outlets are all made in outlet-chambers (designated O) placed between the variators. It is proposed that the chambers have outlets in their tops communicating with the top of pipe to supply dry steam for power; also others communicating with the bottom by a side channel, so that the water will be carried with the steam for heating purposes. Bottom outlets are also to be provided, similarly connected to bottom and top, the former being well adapted for connection with steam-traps to keep the main pipes drained. In the drawings the top outlet-pipes are designated $m$, the bottom ones $n$. It is proposed to drain the main pipe through a trap into another pipe used specially for water heating and for returning water to boilers. Further details of outlet-chambers and return-pipes are reserved for another application.

The pipes are to be laid in subterranean galleries, inclosed by a box or pipe, A, square, circular, or otherwise shaped, made of wood, metal, brick, earthenware, cement, or other materials. The exterior pipe shown is in form adapted to be made of cement. It may be made in any number of parts. Two are shown in Fig. 9—viz., an upper and lower section, the latter being provided with a base, which is to be set on a flag, brick, or other suitable foundation. The space between the steam-pipe and outer pipe is to be filled with mineral wool or any combination of non-conducting materials arranged in any desirable manner.

In laying steam-pipes careful drainage is essential, so as to carry off with certainty any water approaching the pipes by percolation from the surface or from springs, underground water-courses, or other sources. To accomplish this I prefer to lay two drains, one in either side of the ditch, and somewhat below the steam-pipe and its coverings. The drains are preferably made of the ordinary clay drain-tile of commerce, covered for a little distance by broken stone or brick, coarse gravel, or other porous filling, to establish a quick hydraulic gradient toward the drain, though for short distances the ordinary broken-stone blind drains, without tile, will answer if given sufficient longitudinal descent. By this method of construction it is possible to lay the steam-pipe galleries or coverings directly on undisturbed earth in the center of the trench, the drains being made in side trenches dug in the lower angles of the excavation as far from the center as circumstances will permit.

In the drawings, $d\ d$ represent the drain-tiles; $d^2\ d^2$, stone filling above the same, and $d^3$ the outline of the general cross-section of the trench, the undisturbed earth, as shown by dotted line in Fig. 9, arching up in the center of the trench between the drains, which latter are connected, if desired, at intervals by cross-channels $d^4$, which may be arranged, if desired, in special foundations supporting the pipe-galleries at intervals. These special foundations are, however, not essential in most soils, as by my system the earth can be left undisturbed in the center of the trench and will not settle. At the most, a little concrete covering on the soil at intervals, in which to bed the ends of the sections of the pipe-galleries, will be all that is necessary. The arrangement of the drains at the sides of the trenches insures that the water is kept—in fact drawn—away from the steam-pipe and its coverings, instead of being drawn toward the latter, as is the case when a single drain-pipe is laid in the center of the trenches. The latter has the further disadvantage of preventing the making of a good simple foundation for the steam-pipes. With my system of construction a single drain-tile may be used at one side only of the trench, so long as the broken stone or porous filling is made on both sides, and the two parts are connected at intervals by cross-drains, which may be simply broken stone laid in cross-channels in the original soil. With side drains of this kind it is easy to connect to cesspools in certain localities, from which the fluid can be allowed to run into the sewers through a check-valve ordinarily, but pumped out by special means when the sewers are running so full that they would, if ordinary drainage were employed, cause the steam-pipes to be saturated rather than kept dry. The details of this feature it is proposed to show in another application.

In Fig. 2 of the drawings, $w$ represents the curb of the street, and $x\ x$ gas, water, or other pipes buried in the soil.

A simple form of variator is shown in Fig. 4. It is formed by quickly enlarging or diminishing the pipe, so as to form one or more bulbs, $b\ b\ b$, three being shown. The variator is provided with a loose sleeve or internal pipe, $s$, of practically the same internal diameter as the main pipe, to secure a smooth interior surface, and to prevent the friction and loss of head that would result if the steam or fluid came in contact with the bulbs direct. This sleeve may simply fit the ends of the variator fairly, but with sufficient freedom to permit the latter to expand. For facility of construction I let the pipes enter freely and clip the ends, so that the spring of the points left by the cut will prevent the sleeves from rattling under friction. The sleeve is made short enough to permit the variator to contract to its shortest length, and the cylindrical spaces at the ends should be left long enough so that the sleeve will never leave a free opening from the pipe to the enlargements; or, if desired, the sleeve may have a small piece of corrugated iron around it (see section Q, Fig. 4) in a central lobe (fastened to sleeve by screws or pins from the inside, or in any suitable manner) of such size as to maintain the sleeve nearly in the center of its movement as the lobes change shape. A flat sheet may be bent around and sprung in the variator to form the sleeve $s$; or the main pipe itself may on one side be carried through the variator and be guided at the farther end. The variator is represented as terminating at each end with a flange, $f$, connecting to flanges on the main pipe $p$; but any other common method of making a tight connection will answer. For certain purposes the variators would be cast as part of a piece of pipe, preferably at one end, as in Fig. 10, so that the sleeve $s$ could be inserted. An outlet-chamber, O, could also be cast on same pipe. In other cases the bulb-variators, Fig. 4, may be made of wrought-iron, copper, or other metal riveted to flanges or pieces of pipe, or the ends expanded in flanges or pipe.

Modifications in the method of constructing the variator are shown in Figs. 5, 6, 16, and 17.

In Fig. 5 annular disks $g\ g$, of thin metal, are shown riveted together through a spacing-ring, $a$, at their peripheries, and each is riveted at its center to one flange, $f'$, on a piece of pipe provided with flanges $f$ or other suitable means of connection to other pipe—a hub, $h$, to receive screw-threads, for instance.

In Fig. 6 disks $g\ g$ are dished and corrugated and the outer edges riveted together. The inner edges are separated sufficiently for the desired movement. In the drawings the inner edges are shown flanged outwardly and expanded in heavy flanges for connections to pipe.

In each of the Figs. 5 and 6 a sleeve, $s$, may be inserted to keep the interior surface of pipe nearly smooth.

The plates in Fig. 5 may be corrugated and flanged, if desired, or different features of any one form combined with one or more of those in the other.

The construction in Figs. 5 or 6 may be duplicated, like the duplicate bulbs in Fig. 4; or one comparatively rigid annular plate, $g$, may be used, as then all the work on one side can be cast together.

The rigid plate may be made nearly straight or convex outwardly, like half of one of the bulbs shown in Fig. 4, or of that shown in Fig. 6; or such rigid plate may be made concave outwardly, as at $g'$, Fig. 16, in which figure $g$ is the elastic plate, and $p$ and $p$, as before, the sections of pipe connected through variator, a sleeve, $s$, (shown in dotted lines,) being inserted to keep the pipe smooth.

The construction shown in Fig. 16, with the sleeve omitted, is identically that usually used on the side pipes of large beam-engines, though sometimes the general form shown in Fig. 5 is adopted.

Fig. 17 shows one of the various combinations possible with the various forms of variator described, being practically the arrangement in Fig. 16 doubled and combined with that shown in Fig. 5, $p$ and $p$ being the pipe, as before; $g'$, the comparatively rigid disks, and $g\ g$ the elastic disks, connected together in pairs at the inner and outer edges alternately, as shown, so that several plates are flexed at the same time. The middle pair may be shaped like those in Fig. 6, if desired; but the arrangement shown in Fig. 17 is preferred, as all the plates are of equal stiffness under strain. In Fig. 17 one of the pipes $p$ is shown extended through the variator to form the sleeve $s$; but the sleeve may be applied separately, if more convenient. Sleeves $s$ or their equivalent are preferably used in all the variators. The direction of the pipe may be slightly changed at a variator, sufficient generally to make the pipe conform to the grades and longer curves of the streets.

It will be seen that in either of the forms of variator described the metal is so arranged that it will spring considerably to permit the pipes to expand and contract. If the variators be placed with sufficient frequency, the distortion of the sides of the bulbs or chambers will not strain the metal beyond its limit of elasticity, and the construction will be as permanent as that of anything made of metal. Inasmuch, however, as the pipes would rarely be very cold and the daily changes would ordinarily be of limited range, it would answer with some materials to exceed the limit of elasticity a little when pipes cooled off, so long as the strains due to daily changes were well within the limits of elasticity, some materials withstanding a large number of repetitions of overstrain if not repeated at frequent intervals. It will thus be seen that the proportions and number of the variators advisable may be ascertained by experiment and calculation, the same as in any construction involving knowledge of the physical properties of materials.

Evidently the variators may be stretched about as much as they can be compressed without straining metal beyond the limits of elasticity; but if the pipes were laid cold and without strain the entire expansion would cause compression, and about half the range of the variators be lost. To obviate this the variators may be stretched, while the pipe is being laid, an amount equal to about half the expansions of pipes, so that a less number of variators would be required. One means for doing this is shown in Figs. 1, 2, and 3.

The outlet-chamber O is provided with lateral arms $k\,k$, connected by screw-bolts $c\,c$ with arms $j\,j$, secured either to the pipe-gallery or to the ground. The latter may be accomplished by making the arms part of a bed-plate bolted to a foundation, or simply posts embedded in the earth, as shown. The posts may be of wood, metal, or masonry. If either of the latter, non-conducting washers of earthenware, glass, paper, or some similar material, (designated $c'\,c'$ in an enlarged view between Figs. 1 and 2, showing the head of an anchorage-post, $j$,) should be inserted under the nuts, and the bolts finally protected from wasting heat by non-conductors if not inclosed in the main gallery. Evidently the nuts on bolts may be operated to stretch the variator last laid, for purposes specified. As soon, however, as the next variator is stretched correspondingly, the bolt and anchorage previously strained are relieved, and after the pipe is laid, if the ends are secured, there should be little or no strain on the intermediate anchorages, whatever the steam-pressure or temperature, and in fact the outlet-chambers would keep their positions substantially, whether anchored or not, so that for cheapness it may be expedient to use some temporary devices—such as levers and props—for stretching the variators while laying pipe, and employing some less elaborate permanent anchorages.

The proper initial strain on variators may also be obtained by securing the ends of pipe when heated to about a mean temperature; or, when the elastic dishes of the variator are made of malleable material—as of plate-iron or copper—such disks may be dished so as to be extended to the utmost desired limit when cold, the effect being that when put in position the whole change of shape due to expansion of pipes would be by compression, and the ordinary set of the disks, when hot, be about as previously determined. For instance, the plates $g$ $g$ in Fig. 5, which are shown straight, could be constructed in a dished form, something like those in Fig. 6, and would approximate the straight form when connecting-pipes were heated. The flat elastic plates $g\,g$, Fig. 5, may be corrugated slightly, as in the construction of steam-gages, so as to permit them to bend more easily during the expansion and contraction of the connecting-pipes. When the pipes are laid without putting the variators under initial strain the anchorages $j$ and connections to outlet-chambers still serve to keep the various sections of pipe in place longitudinally and regulate the amount of motion at each variator.

The variators, particularly of the form shown in Fig. 5, may form the outlet-chambers under certain conditions. In such case the sleeve $s$ should be omitted or preferably perforated, when service may be taken from an outlet, $n'$, which would be placed at the top of the variator-chamber to deliver dry steam, and at the bottom to remove the water of condensation with the steam. When variators of this kind are located centrally between the anchorage, as shown, the spacing-rings $a$ would be stationary, permitting the taking out of service-pipes, the main pipes either side expanding alike from the nearest anchorages. Under other circumstances, or in any case desired, anchorage-bolts $c$ could connect anchorages $j$ with the spacing-ring $a$.

Variators may be put in laterals and serve not only to permit expansion, but to furnish flexibility if the outlet in main pipe has a longitudinal movement.

Saddles of some kind should be employed to support the steam-pipe in the gallery—for instance, one of the segmental chocks $t$, Fig. 9. It may be made cellular, of earthenware or any suitable substance, being separated, if desired, from the pipe by a ring of paper, $r$. When the elastic sides of the variators are comparatively thick, so that expansion causes considerable end strain, it is advisable to support the pipe all around from the walls of the gallery by chocks $t$, arranged in a circle, as shown in Figs. 1, 2, and 9, or other equivalent means, and so prevent the possibility of buckling.

Figs. 7 and 8 show in two positions a form of variator adapted more particularly for hot-water pipes. The inner edge of an annular gum or fibrous diaphragm, $l$, is bolted under a flange, $o'$, to a connection, $v$, on one end of a pipe, $p$, and the outer edge is bolted to an enlarged piece, $q$, attached to a connecting-pipe, $p'$. A hood, $u$, slides loosely over the piece $v$, keeping the two pipes in alignment. The diaphragm $l$ lies in a fold between $u$ and $v$ until it is extended to the position in Fig. 8. The flange $o'$ is secured to the sleeve $s$, so that by breaking the joint between $u$ and $q$ and that at $o'$ the pipes $p$ and $p'$ are separated, so that the diaphragm may be renewed. Evidently, too, the variators in either form may be made of sheet-gum or other flexible material strengthened by bands and rings. For instance, in the form shown in Fig. 4 a ring, R, or equivalent, would be necessary at each of the smaller diameters to prevent the elastic material from being forced outwardly by internal pressure and preserve the uniform strength of the main steam-conducting pipe. A cylinder of rubber clamped to the contiguous ends of pipes to be connected thereby would under pressure bulge out between the bands and serve for a limited range the same purpose as one of the lobes $b$. The use of metal in forms substantially as described is, however, preferred.

In certain cases it is proposed to keep the main pipes thoroughly drained of water, either by taking out service from the bottom of each lobe of each variator and from each outlet-chamber or other low point, or, as shown in Figs. 11 and 12, by connecting such points by a pipe, E, bent or run in serpentine form, as shown, to permit expansion, and to take service for heating purposes out of this pipe at one or more points—J, for instance—or at will connect such pipe through a trap, T, Fig. 13, (which will permit the passage of water, but not of steam,) to a return-pipe, F. This return-pipe F would also receive through a pipe—G, for instance—water of condensation from the buildings—H, for instance—heated with steam from the main steam-pipe, $m$, Fig. 13, being the service-pipe to buildings H, and $m^2$ a radiator in such building, for heating the same, from which radiator the water of condensation passes through the return-pipe G, and another trap, T, if desired, to the street-main return-pipe F, laid somewhat like the steam street-mains shown in Figs. 1 and 2. The water in the return-pipe F would by suitable suction and force pumps—P, for instance—be returned to the boilers—B, for instance—supplying steam to the main pipe, being used, if desired, to heat buildings by hot-water circulation en route, such arrangement being reserved for another application.

The arrangement of details sufficient to make a complete steam heating and power system is more clearly shown in Figs. 14 and 15, in which B represents a boiler, or, in general, generators or supplying apparatus, which deliver the fluid to a main high-pressure pipe, $p^5$, provided with variators $V^{40}$ at intervals to permit expansion. Generally it is desirable to arrange main pipe $p^5$, as well as other mains hereinafter described, longitudinally under the public streets, as is intended to be represented. Steam or fluid may be taken from main $p^5$ for either power or heating purposes, $m^2$ representing a service-pipe or lateral for this purpose. As described in my pending applications for patents on steam-meters, either the steam or the water of condensation therefrom would in general be passed through a meter to ascertain the quantity as a basis for charges. As also therein explained, the steam may be measured at constant pressure obtained by a regulating-valve, or an apparatus be attached to meter to allow for variations in pressure. In Fig. 14 the steam or fluid conducted through service-pipe $m^2$ is first passed through a regulating-valve, or a valve automatically throttling steam of a higher pressure to a constant pressure, (designated $m^{19}$,) to a meter, $m^{21}$, from which, in one case, it passes to an engine, $E^{50}$, and is discharged therefrom through a pipe, $m^5$, directly into the atmosphere, or preferably into a low-pressure street-main, $p^6$, provided with outlets to discharge the steam into buildings for use, or, if in excess, to waste through a safety or relief valve. Steam or fluid from pipe $m^2$ may also be taken into a house for heating purposes through a special meter; or, as shown in Fig. 14, both the steam for power and for heating may be conducted in pipe $m^2$ through meter $m^{21}$, the supply to engine going directly, but that to heating-coils $m^{24}$ $m^{25}$ being preferably led through a regulating-valve, $m^{23}$, to reduce the pressure, the latter arrangement, together with the meter, being shown separately in the plan. The condensed water from the coils is conducted either by separate pipes from each coil, or through a series of coils, as shown, to a steam-trap, $T^2$, and there, being separated from any accompanying steam, is delivered through pipe $f^2$ either to waste or preferably to a return water-pipe, F, which returns it to the boiler-house, so that it can be pumped into the boiler by a pump, P. Similarly steam from low-pressure main $p^6$ may be conducted through a service-pipe, $m^3$, a regulating-valve, $m^{26}$, a meter, $m^{27}$, a second regulating-valve, $m^{28}$, if needed or desired, and a pipe, $m^{29}$, to radiators or heaters $m^{30}$ and $m^{31}$, and the water of condensation passed through a trap, $T^3$, and pipe $f^3$ to the return water-main F. Service-pipes for either power or heating purposes would of course be provided for each building or group of buildings to be connected. The terms "coil," "radiator," and "heater" are herein used interchangeably, either indicating in general a device for heating with fluids.

The mains $p^5$, $p^6$, and F are shown provided with variators $V^{40}$, $V^{30}$, and $V^{20}$ at intervals to permit expansion. The laterals $m^2$, $m^5$, $m^3$, $f^2$, and $f^3$ are also shown provided with two variators, (each designated $V^{23}$,) the object of which is not so much to provide for expansion in the laterals as to permit expansion of the mains without injuring the laterals, for, as has been explained, the line of the pipe may be changed somewhat at the variators, or, in effect, a bend may, on account of the elastic plates, be readily made at those points.

By using a pattern of variator resembling Fig. 5 and omitting the sleeve $s$ the deflection of pipe at each variator may be made quite considerable.

One variator in each lateral near the main will answer when the lateral itself can spring somewhat; but often two, or even more, will be better.

The variators may be drained either by a pipe, $n'$, attached to the bottom of each lobe, or, as shown in Fig. 4, by a pipe, $m'$, extending inside the variator, around the main pipe or sleeve, and terminating with an open end at the bottom.

My general system of construction with variators makes the pipe a continuous chamber, unbroken throughout its length, and it is therefore particularly adapted for carrying steam or hot fluids in the public streets; and from the fact that such pipe may be made straight to lie parallel with curbstones, gutters, or with other street-pipes, or slightly flexed at the elastic variators to avoid inaccurate alignment of the latter, or to conform to gradual curves in streets, either horizontal or vertical, as well as the fact that no man-holes are necessary, or continual taking up of pavements to mar and interrupt the use of the roadway in order to pack stuffing-boxes, all taken together make the combination of a pipe constructed in this way with the curb, gutter, or distinguishing lines of a public highway or street a new combination, in which the elements, being adapted for each other, produce in combination new and useful results.

I claim as my invention and desire to secure by Letters Patent—

1. A main pipe for the conduction of fluids, provided with a series of flexible or elastic sections or variators to permit expansion and contraction, and a series of outlets to permit the distribution and delivery of the fluid.

2. In combination with a main pipe, $p$, the variators V and branch pipes $m$ and $n$, substantially as and for the purposes specified.

3. In combination with a steam street-main and an exterior protecting-gallery for the same, the skeleton segments or chocks $t$, substantially as and for the purposes specified.

4. A main pipe for conveying fluids, made continuous without slip-joints or stuffing-boxes, and provided with means, substantially as described, for permitting expansion and contraction, and for supplying fluid at intervals, in combination with and adapted to the distinguishing locating features of a public highway or street.

5. In combination with the elastic variators, arranged at intervals in a steam main pipe, anchorages and attachments from the same to the main pipe at or near the outlets, substantially as described.

6. A curved outlet-pipe, $m'$, combined with the bottom of a lobe of an elastic variator, substantially as and for the purposes specified.

7. An outlet, $n'$, combined with the enlarged chamber of an elastic variator.

8. An annular flexible diaphragm, $l$, combined with the two sections of a pipe, substantially as and for the purpose specified.

9. The combination of the diaphragm $l$, sleeve $v$, hood $u$, and chamber $q$ with the pipes $p$ and $p'$.

10. In combination with a main for conveying heated fluids, drains $d\ d$, arranged at the lower corners or angles of the trench in which such street-main is laid and below the level of the soil or other supports under such main, substantially as and for the purpose specified.

11. A continuous metallic main pipe constructed without slip-joints or stuffing-boxes, but provided with elastic sections or variators at intervals to permit expansion and contraction, and outlets to service-pipes and laterals at intervals, in combination with apparatus for the supply of steam or other fluid adapted to furnish heat and power.

12. In combination with a main pipe for conveying heated fluids and a lateral connected therewith, one or more variators in the lateral to make the same flexible and permit free expansion of the main without injuring the lateral.

13. The separate lengths of pipe, rigid disks or flanges, and elastic disks, in combination with each other and with the smooth pipe extended through the space within the disks.

CHAS. E. EMERY.

Witnesses:
J. B. WHITE,
R. E. ROCKWELL.

It is hereby certified that in Letters Patent No. 253,917, granted February 21, 1882, to Charles E. Emery, of Brooklyn, New York, for an improvement in "Apparatus for Supplying Cities with Steam, &c.," the word "tightness" in line 11, on page 2 of the printed specification attached to and forming a part of said Letters Patent, was erroneously printed "lightness;" that the proper corrections have been made in the files and records pertaining to the case in the Patent Office, and are hereby made in said Letters Patent.

Signed, countersigned and sealed this 14th day of March, A. D. 1882.

[SEAL.]

A. BELL.
*Acting Secretary of the Interior.*

Countersigned:

E. M. MARBLE,
*Commissioner of Patents.*